United States Patent

Inoue

Patent Number: 5,210,619
Date of Patent: May 11, 1993

[54] CHROMA PHASE MODULATOR

[75] Inventor: Kouichi Inoue, Yokohama, Japan

[73] Assignee: Kabushiki Kaisha Toshiba, Kawasaki, Japan

[21] Appl. No.: 889,386

[22] Filed: May 28, 1992

[30] Foreign Application Priority Data

May 29, 1991 [JP] Japan ................................. 3-124299

[51] Int. Cl.$^5$ ........................... H04N 9/89; H04N 9/64
[52] U.S. Cl. .................................. 358/320; 358/324; 358/28
[58] Field of Search ................. 358/28, 329, 320, 337, 358/326, 324, 27

[56] References Cited

U.S. PATENT DOCUMENTS

| | | | |
|---|---|---|---|
| 4,123,774 | 10/1978 | Hjortzberg | 358/328 |
| 4,266,241 | 5/1981 | Hjortzberg | 358/328 |
| 4,292,648 | 9/1981 | Koval | 358/326 |
| 4,814,859 | 3/1989 | Kimura et al. | 358/27 |
| 4,860,091 | 8/1989 | Kimura et al. | 358/27 |

FOREIGN PATENT DOCUMENTS 2-261291 10/1990 Japan .

*Primary Examiner*—John K. Peng
*Attorney, Agent, or Firm*—Finnegan, Henderson, Farabow, Garrett & Dunner

[57] ABSTRACT

An A/D converter converts a composite video signal to a digital signal. A bandpass filter extracts a chroma signal-A sinX from the composite video signal in digital form. A delay circuit delays the chroma signal-A sinX by ¼ fsc to output-A cosX. Delay circuits delay the chroma signal-A sinX by ½ fsc to output A sinX. A ROM stores values of $-(1 - \cos\theta)$ and $\sin\theta$. Values of $-(1 - \cos\theta)$ and $\sin\theta$ are read from the ROM in accordance with a phase modulation amount $\theta$ of a voltage controlled oscillator. A multiplier multiplies a value of $\sin\theta$ read from the ROM and A cosX output from the delay circuit. A multiplier multiplies a value of $-(1 - \cos\theta)$ read from the ROM and A sinX output from the delay circuit. An adder adds outputs of the multipliers. Delay circuits delays the composite video signal output from the A/D converter. An adder adds an output of the adder and the composite video signal output from the delay circuit.

16 Claims, 5 Drawing Sheets

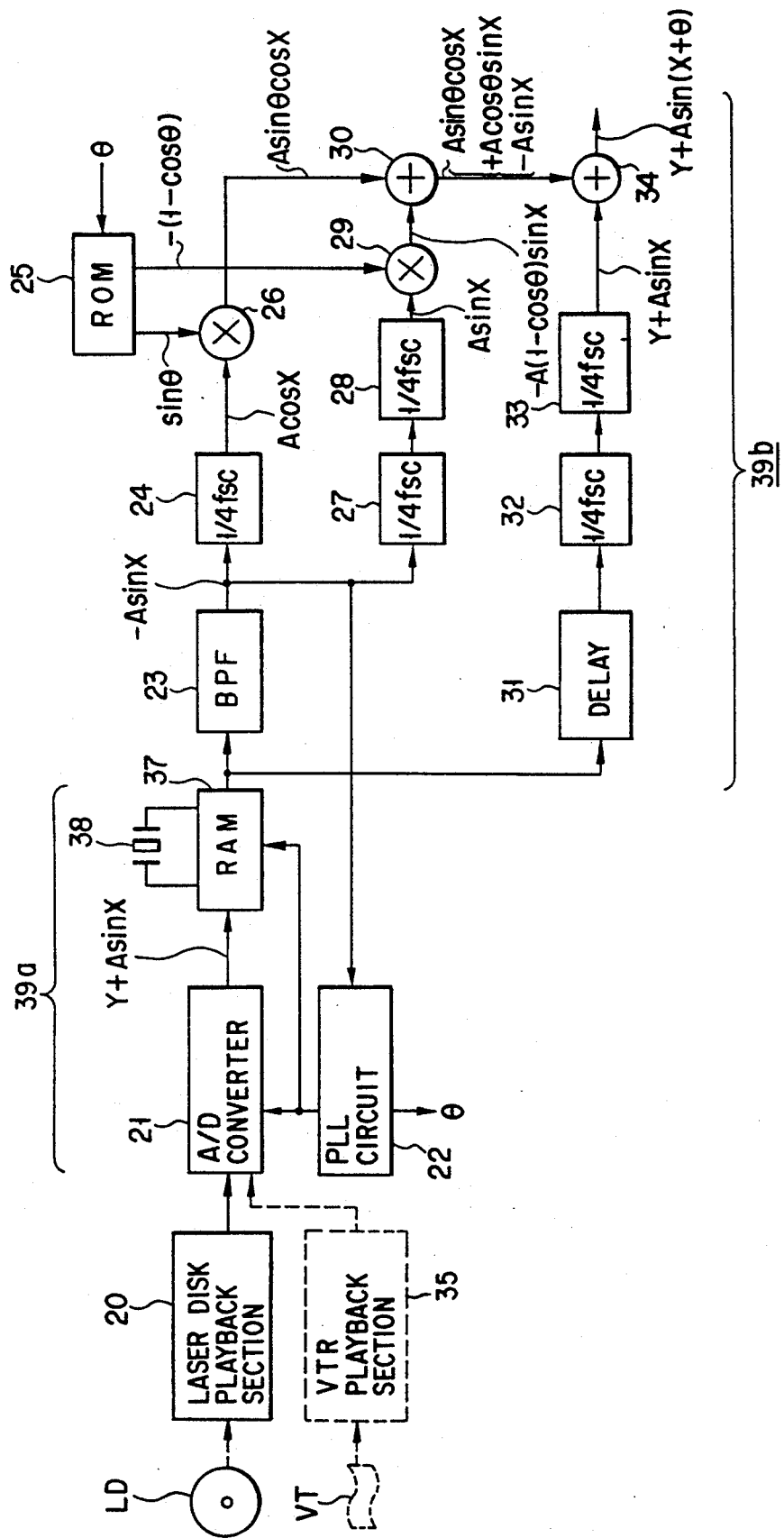
F I G. 1

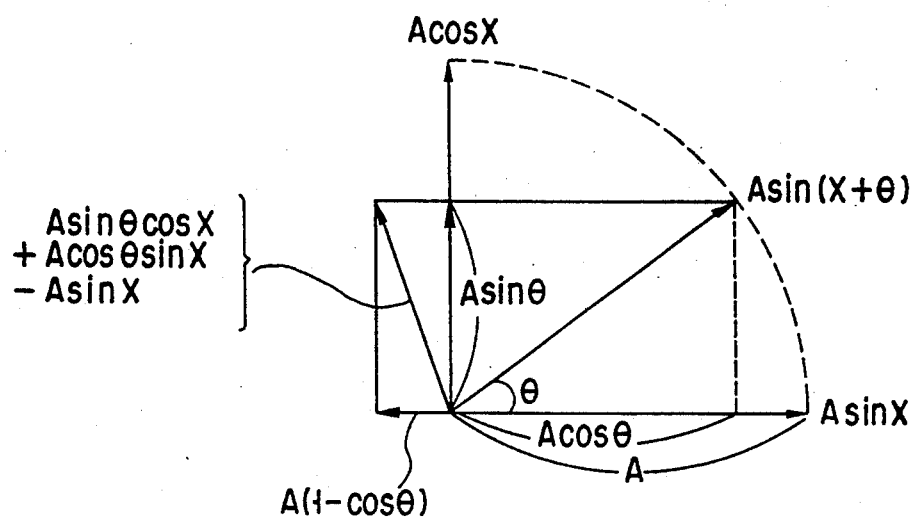
F I G. 2
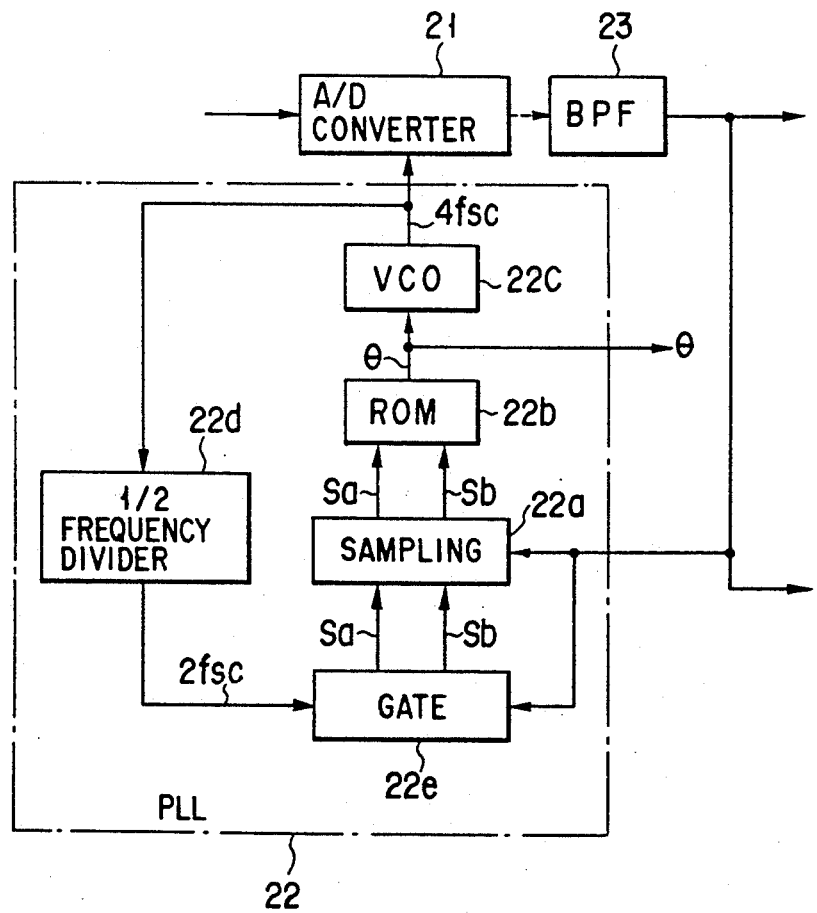
F I G. 3

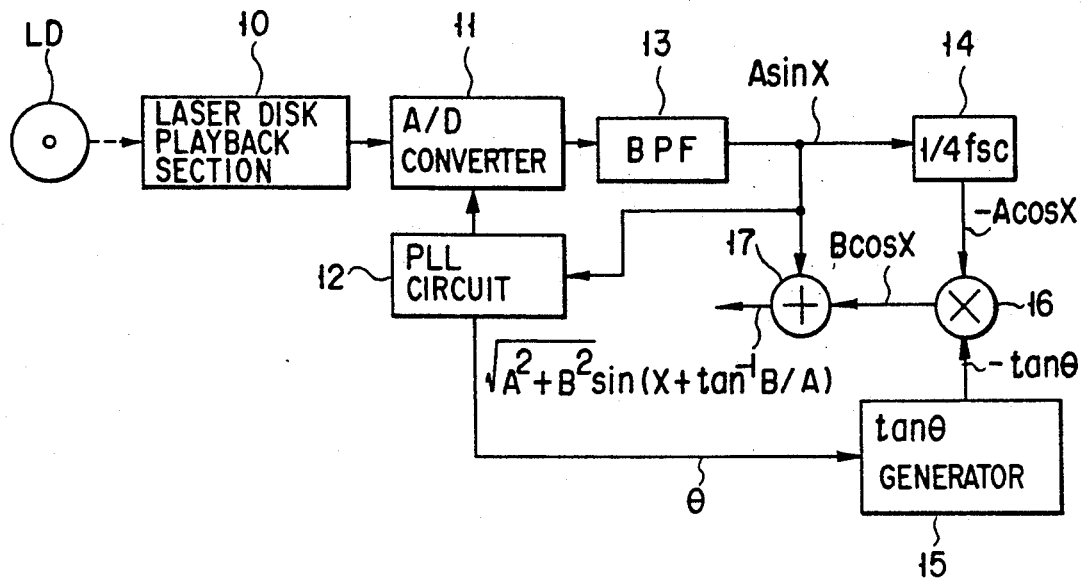
F I G. 8
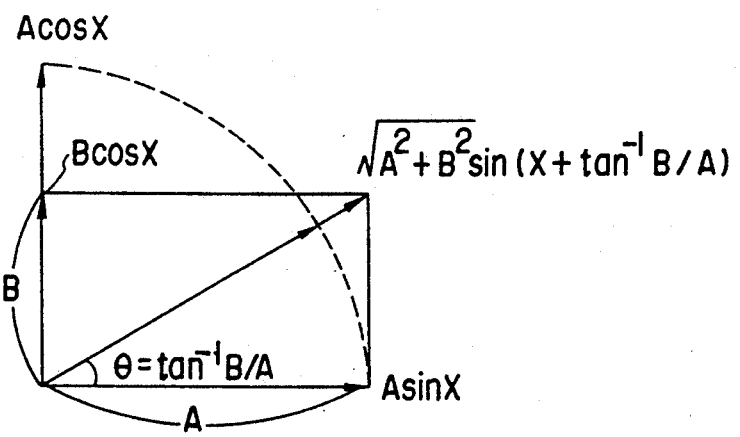
F I G. 9

CHROMA PHASE MODULATOR

BACKGROUND OF THE INVENTION

1. Field of the Invention

The present invention relates to a chroma phase modulator for use in a time base corrector in video equipment such as video tape recorders and laser disk players.

2. Description of the Related Art

FIG. 8 illustrates a conventional chroma phase modulator, and FIG. 9 illustrates the operating principle of the circuit of FIG. 8.

In FIG. 8, a laser disk playback section 10 plays a video signal and an audio signal back from a laser disk LD. A composite video signal Vs containing a luminance signal and a chroma signal (e.g., $Y + A \sin X$, Y: luminance signal, $A \sin X$: chroma signal), which is output from the laser disk playback section 10, is applied to an analog-to-digital (A/D) converter 11. The A/D converter 11 is supplied with a clock signal CK having a frequency of 4 fsc (fsc: the color subcarrier frequency of, say, 3.58 MHz) from a phase locked loop (PLL) circuit 12, converting the composite video signal to a digital signal in accordance with the clock signal CK. The composite video signal in digital form is applied to a bandpass filter (BPF) 13 that extracts the chroma signal ($A \sin X$) and a color burst signal from the composite video signal. The chroma signal is delayed in phase by 90° by a delay circuit 14 which introduces a time delay of ¼ fsc, resulting in $-A \cos X$.

On the other hand, control data from a voltage controlled oscillator (VCO) included in the PLL circuit 12, i.e., the amount $\theta$ of phase modulation, is applied to a $\tan\theta$ generator 15 for generating values of $-\tan\theta$. The phase modulation amount $\theta$ is generated by sampling the burst signal output from the bandpass filter 13. The $\tan\theta$ generator 15 may comprise a read only memory (ROM) adapted to store values of $\tan\theta$. The values of $-\tan\theta$ stored in the $\tan\theta$ generator 15 are accessed by the phase modulation amount $\theta$. The value of $-\tan\theta$ read from the generator 15 and $-A \cos X$ output from the delay circuit 14 are applied to a multiplier 16 where they are multiplied. Assuming $\theta = \tan^{-1}(B/A)$ and since $\tan\theta = B/A$, the product, $B \cos X$, is output from the multiplier 16. The product $B \cos X$ and the chroma signal $A \sin X$ are applied to an adder 17. The output of the adder 17 is given by $$A \sin X + B \cos X = (A^2 + B^2)^{\frac{1}{2}} \sin(X + \tan^{-1}(B/A)) \quad (1)$$

This output signal is $\tan^{-1}(B/A)$ out of phase with the chroma signal $A \sin X$. Since $\tan^{-1}(B/A)$, the signal represented by equation (1) can be considered to be equivalent to phase modulation of the chroma signal by $\theta$.

It will be appreciated from the operating principle shown in FIG. 9 and equation (1) that the amplitude of the chroma signal phase modulated by the prior art circuit becomes $(A^2+B^2)^{\frac{1}{2}}$, not A, that is, the phase-modulated chroma signal becomes larger in amplitude than the original chroma signal. If, therefore, the phase modulation amount is particularly great, great errors will be produced.

SUMMARY OF THE INVENTION

It is an object of the present invention to provide a chroma phase modulator which permits phase modulation of a chroma signal with its amplitude unchanged.

According to an aspect of the present invention, there is provided a chroma phase modulator comprising:

first phase shift means for shifting the phase of a chroma signal-$A \sin X$ extracted from a composite video signal ($Y + A \sin X$) by 90° to output a chroma signal $A \cos X$;

output means responsive to application of a phase modulation amount $\theta$ ($\theta$ is any value to satisfy $-\pi/2 < \theta < \pi/2$) thereto for outputting coefficients $-(1-\cos\theta)$ and $\sin\theta$;

first multiplying means for multiplying the chroma signal $A \cos X$ output from the first shifting means and the coefficient $\sin\theta$ read from the outputting means in accordance with the phase modulation amount $\theta$ for the chroma signal extracted from the composite video signal;

second shifting means for shifting the phase of the chroma signal-$A \sin X$ extracted from the composite video signal by a predetermined amount to output a chroma signal $A \sin X$;

second multiplying means for multiplying the chroma signal $A \sin X$ output from the second shifting means and the coefficient $-(1-\cos\theta)$ read from the outputting - means in accordance with the phase modulation amount $\theta$ for the chroma signal extracted from the composite video signal; and adding means for adding outputs of the first and second multiplying means and the composite video signal.

BRIEF DESCRIPTION OF THE DRAWINGS

The accompanying drawings, which are incorporated in and constitute a part of the specification, illustrate presently preferred embodiments of the invention, and together with the general description given above an the detailed description of the preferred embodiments given below, serve to explain the principles of the invention.

FIG. 1 is a block diagram of a chroma phase modulator according to a first embodiment of the present invention;

FIG. 2 is a diagram for use in explanation of the operating principle of the circuit of FIG. 1;

FIG. 3 is a block diagram of the PLL circuit of FIG. 1;

FIG. 8 illustrates one example of a prior art chroma phase modulator; and

FIG. 9 is a diagram for use in explanation of the operating principle of the circuit of FIG. 8.

DETAILED DESCRIPTION OF THE PREFERRED EMBODIMENTS

Figures 4, 5:
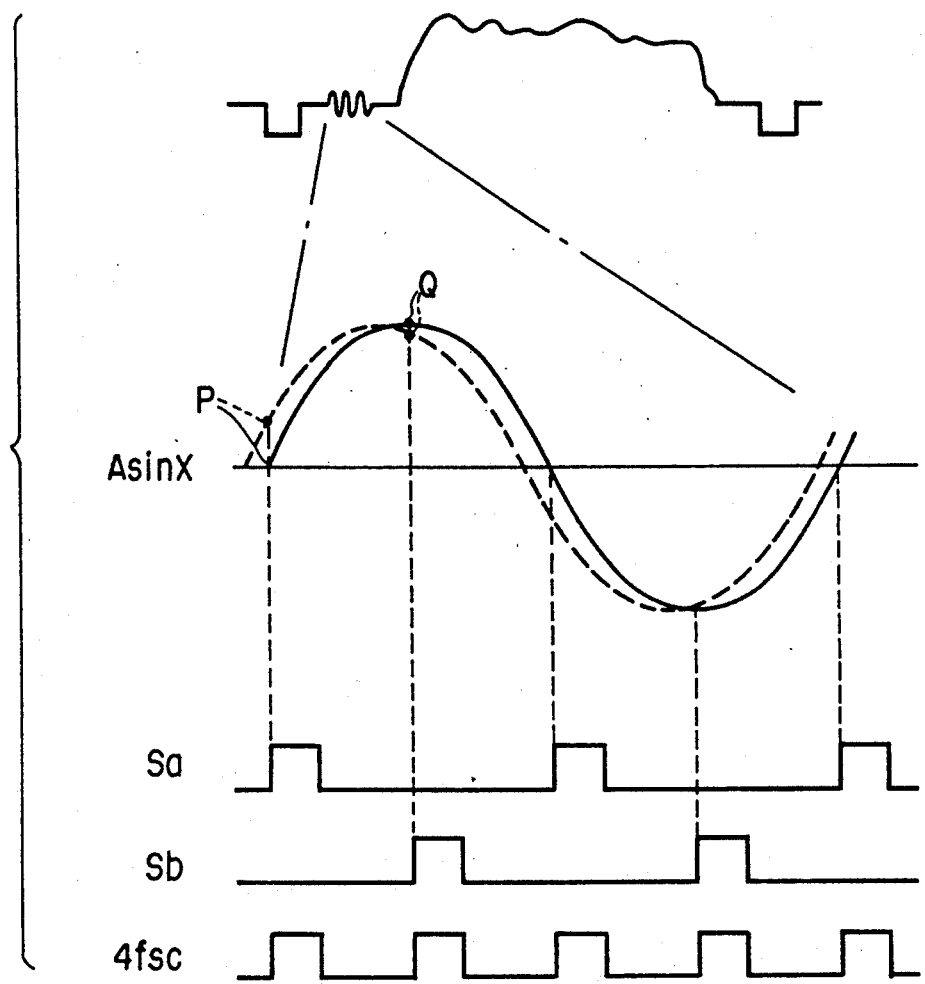
FIG. 4 are waveform diagrams for use in explanation of the operation of the PLL circuit of FIG. 3.
FIG. 5 illustrates the contents of the ROM used in the PLL circuit of FIG. 3.

Referring now to FIG. 1, a laser disk playback section 20 plays a video signal and an audio signal back from a laser disk LD. The laser disk playback section 20 is connected to an analog-to-digital (A/D) converter 21. A composite video signal Vs containing a luminance signal and a chroma signal (for example, Y + A sinX, Y: luminance signal, A sinX: chroma signal), which is output from the playback section 20, is applied to the A/D converter 21. The A/D converter 21 is in turn connected to a phase locked loop (PLL) circuit 22. The A/D converter 21 is supplied with a clock signal CK (its frequency is 4 fsc, fsc: the color subcarrier frequency, say, 3.58 MHz) generated by the PLL circuit 22. In the A/D converter 21, the composite video signal Vs is converted to a digital signal in accordance with the clock signal CK. The output of the A/D converter 21 is connected to an input terminal of a random access memory (RAM) 37. An output terminal of the RAM 37 is connected to a bandpass filter (BPF) 23. The RAM 37 serves as a first-in first-out memory, and the RAM 37, the A/D converter 21 and the PLL circuit 22 constitute a first time base corrector 39a. To the RAM 37 is connected a crystal oscillator 38 serving as a reference oscillator. The composite video signal output from the A/D converter 21 is written into the RAM 37 in accordance with a clock signal output from the PLL circuit 22 and read from the RAM 37 in accordance with a clock signal output from the crystal oscillator 38. The composite video signal read is applied to the bandpass filter 23. The chroma signal-A sinX and a color burst signal are taken from the composite signal by the bandpass filter 23. The output of the bandpass filter 23 is connected, on one hand, to a delay circuit 24 introducing a time delay of ¼ fsc to its input signal, and, on the other hand, to a series combination of two delay circuits 27 and 28 each introducing the same time delay as the delay circuit 24, i.e., ¼ fsc. Each of these delay circuits may comprise a shift register, for example. The chroma signal output from the bandpass filter 23 is delayed by the delay circuit 24, becoming chroma signal A cosX which has been delayed 90°. By the series combination of the delay circuits 27 and 28, the chroma signal is delayed by 2× fsc, becoming A sinX.

Control data from a voltage controlled oscillator (VCO, not shown) included in the PLL circuit 22, i.e., the phase modulation amount $\theta(-\pi/2 < \theta < \pi/2)$ for the chroma signal is applied to a ROM 25. The arrangement of the PLL circuit 22 will be described later. The ROM 25 stores values of $\sin\theta$ and $-(1-\cos\theta)$, which are accessed by the phase modulation amount $\theta$. The outputs of the ROM 25 are connected to first inputs of the multipliers 26 and 29. The second input of the multiplier 26 is connected to the output of the delay circuit 24, while the second input of the multiplier 29 is connected to the output of the delay circuit 28. A value of $\sin\theta$ read from the ROM 25 and the chroma signal, A cosX, output from the delay circuit 24 are applied to the multiplier 26 for multiplication. A value of $-(1-\cos\theta)$ read from the ROM 25 and the chroma signal, A sinX, output from the delay circuit 28 are applied to the multiplier 29 for multiplication. The outputs of the multipliers 26 and 29 are connected to an adder 30 where A sin$\theta$ cos$\theta$ output from the multiplier 26 and $-A(1-\cos\theta)$ sinX output from the multiplier 29 are added together. Thus, A sin$\theta$ cosX + A cos$\theta$ sinX − A sinX is output from the adder 30.

To the output of the A/D converter 21 is connected a series combination of a delay circuit 31 that provides the same time delay as the bandpass filter 23, and delay circuits 32 and 33 each introducing a time delay of ¼ fsc.

Each of these delay circuits may be constructed from a shift register. The composite video signal, Y + A sinX, output from the A/D converter 21 is delayed by each of the delay circuits 31, 32, and 33 in succession. The output of the delay circuit 33 is connected to an input of an adder 34 the other input of which is connected to the output of the adder 30. The adder 34 performs an arithmetic operation represented by $$Y + A \sin X + A \sin\theta \cos X + A \cos\theta \sin X - A \sin X$$
$$= Y + A \sin\theta \cos X + A \cos\theta \sin X$$
$$= Y + A \sin(X + \theta)$$

Thus, a composite video signal Y + A sin(X + $\theta$) is output from the adder 34. The chroma signal A sin(X + $\theta$) in the composite video signal output from the adder 34 is $\theta$ out of phase with the chroma signal A sinX in the original composite video signal Y + A sinX. That is, the chroma signal has been subjected to phase modulation.

In the above embodiment, the components including from BPF 23 up to the adder 34, which construct a second time base corrector 39b.

FIG. 2 illustrates a relationship among signals at various locations in the chroma phase modulator. As can be seen from FIG. 2, according to the chroma phase modulator of FIG. 1, it is possible to shift the phase of the chroma signal by $\theta$ without changing its amplitude.

FIG. 3 shows a specific arrangement of the PLL circuit 22.

The output of the bandpass filter 23 is connected to an input of a sampling circuit 22a. The sampling circuit 22a samples the color burst signal output from the bandpass filter 23 in accordance with sampling signals Sa, Sb output from a gate circuit 22e. The sampling signals Sa and Sb have an equal frequency of ½ fsc and are 90° out of phase with each other. The sampling circuit 22a samples the burst signal A sinX in response to the sampling signals Sa and Sb.

Where the phase of the color burst signal is not shifted as indicated by a solid line in FIG. 4, the sampling signal Sa samples the color burst signal at its 0° and 180° parts, while the sampling signal Sb samples the color burst signal at its 90° and 270° parts.

Where the phase of the color burst signal is shifted as indicated by a dotted line in FIG. 4, on the other hand, the sampling signal Sa samples the color burst signal at its parts apart from its 0° and 180° parts, while the sampling signal Sb also samples the burst color signal at its parts apart from its 90° and 270° parts.

The value P of the color burst signal sampled by the sampling signal Sa is P = A sin$\theta$, while the value Q of the color burst signal sampled by the sampling signal Sb is Q = A sin($\theta + \pi/2$) = A cos$\theta$. The ratio of P to Q is given by $$P/Q = A \sin\theta / A \cos\theta$$
$$= \tan\theta$$

Transforming this equation for $\theta$ yields $$\theta = \tan^{-1}(P/Q) \quad (2)$$

Therefore, the phase modulation amount $\theta$ can be obtained from the sampled values P and Q of the burst signal.

Outputs of the sampling circuit 22a are connected to a ROM 22b, which stores values of phase modulation amount $\theta$ for a voltage controlled oscillator (VCO) 22c.

That is, as shown in FIG. 5, in the ROM 22b, values of phase modulation amount θ which have been obtained beforehand in accordance with equation (2) are stored to have a one-to-one correspondence with the sampled values P, Q. The phase modulation amount θ stored in the ROM 22b is accessed by sampled values P and Q of the color burst signal output from the sampling circuit 22a. The phase modulation amount θ read from the ROM 22b is applied to a voltage controlled oscillator 22c and the ROM 25. The voltage controlled oscillator 22c generates a clock signal CK corresponding to the phase modulation amount θ. The clock signal CK is applied to the A/D converter 21 and a divide-by-two frequency divider 22d. The frequency divider 22d reduces the frequency of the clock signal CK by two. The output of the frequency divider 22d is connected to the gate circuit 22e. The gate circuit 22e produces the sampling signals Sa and Sb from the clock signal CK output from the divide-by-two frequency divider 22d only during the duration of the color burst signal. The sampling signals are applied to the sampling circuit 22a.

According to the above embodiment, the chroma signal A sinX and A cosX that is ¼ fsc out of phase with the chroma signal A sinX are multiplied by $-(1-\cos\theta)$ and $\sin\theta$, respectively, for subsequent addition to the composite video signal Y + A sinX. Thus, it is possible to shift the chroma signal by θ without changing its amplitude.

In the above embodiment, the first time base corrector 39a corrects the time base in accordance with a phase difference between the clock signal output form the PLL circuit 22 and the clock signal output from the crystal oscillator 38. Most of jitter contained in a video signal played back from a laser disk LD by the laser disk playback section 20 are removed by the first time base corrector 39a. However, the PLL circuit 22 is feedback-controlled, therefore an output signal of the first time base corrector 39a includes residual jitter. On the other hand, the second time base corrector 39b has a range of correction as wide as ±90°, alleviating the burden imposed on the first time base corrector 39a, and the residual jitter contained in the output of the first time base corrector 39a is accurately removed.

As shown in FIG. 1, a VTR playback section 35 may be connected to the A/D converter 21 in place of the laser disk playback section 20. In this case as well, the time base of a video signal played back from video tape can be corrected.

In the above embodiment, RAM 37 and crystal oscillator 38 can be removed, if a phase difference of a jitter contained in video signal output from the laser disk playback section 20 or VTR playback section 35 is less than ±90°. Here, the PLL circuit 22 shown in FIG. 3 may serve as a phase difference detector, in which the voltage-controlled oscillator 22c is replaced of a crystal oscillator. The crystal oscillator, which is not connected to the ROM 22b, generates a clock signal (4 fsc). The generated clock signal is supplied to the A/D converter 21, the frequency divider 22d and the delay circuit 24, 27, 28, 31 to 33. The operation of the phase difference detector is substantialy the same as that of the PLL circuit 22, and the RAM 22b outputs a phase differential signal obtained based on a difference between a output signal from the crystal oscillator and color burst in phase.

Figure 6:
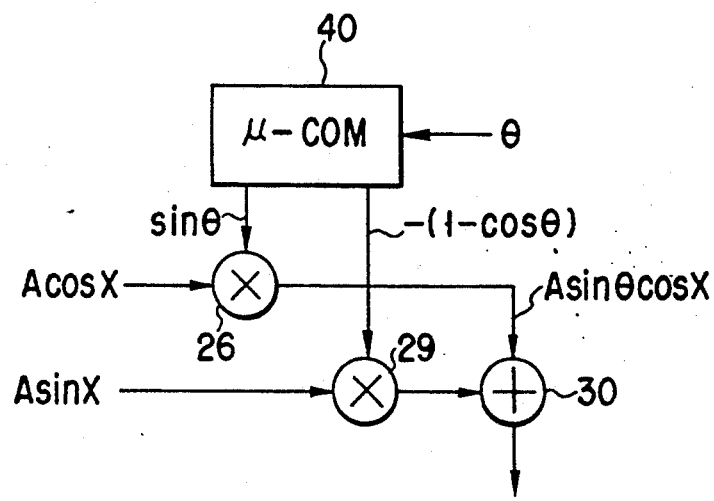
FIG. 6 illustrates the essential part of a chroma phase modulator according to a second embodiment of the present invention.

FIG. 6 illustrates a second embodiment of the present invention, in which like reference characters are used to denote corresponding parts to those in FIG. 6.

In FIG. 1, values of $\sin\theta$ and $-(1-\cos\theta)$ are stored in a ROM 25 and read therefrom in accordance with phase modulation amount θ output from the PLL circuit 22. In the third embodiment, a microcomputer (μ − COM) 40 is provided in place of the ROM 25. The microcomputer 40 has a program for obtaining sin &H and $-(1-\cos\theta)$ and, upon receipt of a phase modulation amount θ from the PLL circuit 22, executes it to obtain corresponding values of $\sin\theta$ and $-(1-\cos\theta)$. The results are applied to multipliers 26 and 29, respectively.

With such an arrangement as described above, the phase of the chroma signal can be controlled with greater accuracy by the program set in the microcomputer 40.

Figure 7:
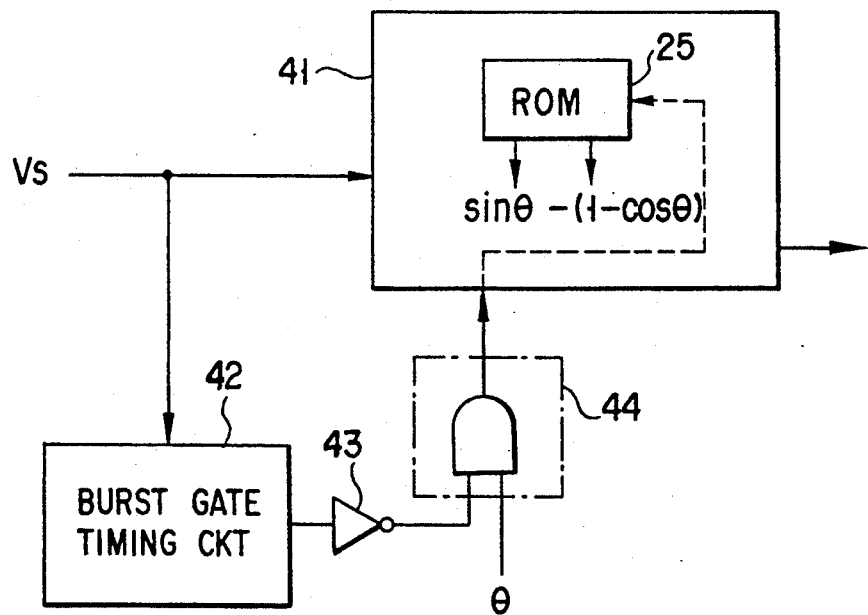
FIG. 7 illustrates a third embodiment of the present invention in which the chroma phase modulator is applied to a hue control device.

FIG. 7 illustrates a third embodiment of the present invention in which the chroma phase modulator is applied to a hue control circuit.

In FIG. 7, a chroma signal Vs is applied to a chroma phase modulator 41 that includes each of the components including from the A/D converter 21 up to the adder 34 of FIG. 1. In this embodiment, however, the ROM 25 is not controlled by phase modulation amount θ from the PLL circuit 22. The composite video signal Vs is also applied to a color burst gate timing circuit 42, which outputs a signal at a high level during the duration of a burst signal contained in the composite video signal Vs. The output signal of the color burst gate timing signal 42 is applied, via an inverter 43, to an input terminal of a color burst gate circuit 44 comprising, for example, an AND gate. The other input of the color gate circuit 44 is externally supplied with arbitrary phase modulation amount $\theta(-\pi/2 < \theta < \pi/2)$. The output of the color burst gate circuit 44 is connected to the ROM 25 included in the chroma phase modulator 41.

In the above arrangement, the other input of the color burst gate circuit 44 is supplied from the inverter 43 with a high-level signal during the period except the duration of a color burst signal in the composite video signal Vs. The color burst gate circuit 44 applies phase modulation amount θ to the ROM 25 during this period. Thus, the chroma phase modulator 41 modulates the video signal except the color burst signal with the externally supplied phase modulation amount θ. Therefore, the phase of a chroma signal can be shifted with respect to the color burst signal, thereby allowing hue to be controlled.

In the third embodiment, the ROM 25 can be replaced with a microcomputer as shown in FIG. 6. In addition, in this embodiment, the A/D converter 21 need not be controlled by the PLL circuit 22.

Although the preferred embodiments of the present invention have been described and disclosed, it is apparent that other embodiments and modifications are possible.

What is claimed is:

1. A chroma phase modulator comprising:
   first phase shift means for shifting the phase of a chroma signal-A sinX extracted from a composite video signal (Y + A sinX) by 90° to output a chroma signal A cosX;
   output means responsive to application of a phase modulation amount θ (θ is any value to satisfy $-\pi/2 < \theta < \pi/2$) thereto for outputting coefficients $-(1-\cos\theta)$ and $\sin\theta$;
   first multiplying means for multiplying the chroma signal A cosX output from said first shifting means and the coefficient sin$\theta$ read from said outputting means in accordance with the phase modulation amount $\theta$ for the chroma signal extracted from the composite video signal;

second shifting, means for shifting the phase of the chroma signal A sinX extracted from the composite video signal by a predetermined amount to output a chroma signal A sinX;

second multiplying means for multiplying the chroma signal A sinX output from said second shifting means and the coefficient $-(1-\cos\theta)$ read from said outputting means in accordance with the phase modulation amount $\theta$ for the chroma signal extracted from the composite video signal; and adding means for adding outputs of said first and second multiplying means and the composite video signal.

2. The chroma phase modulator according to claim 1, in which each of said first and second phase shifting means comprises a delay circuit.

3. The chroma phase modulator according to claim 1, in which said outputting means comprises a memory which stores the coefficients $-(1-\cos\theta)$ and sin$\theta$, these coefficients being read from said memory in accordance with the phase modulation amount $\theta$ of the chroma signal contained in the composite video signal.

4. The chroma phase modulator according to claim 1, in which said outputting means comprises a microcomputer for calculating the coefficients $-(1-\cos\theta)$ and sin$\theta$ in accordance with the phase modulation amount $\theta$ for the chroma signal contained in the composite video signal.

5. A chroma phase modulator comprising:
conversion means for converting a composite video signal (Y + A sinX) to a digital signal;
extracting means for extracting a chroma signal-A sinX from an output signal of said conversion means;
first delay means for delaying the phase of the chroma signal-A sinX extracted by said extracting means by 90° to output a chroma signal A cosX;
second delay means for delaying the chroma signal-A sinX by a predetermined time to output a chroma signal A sinX;
detecting means for detecting a phase modulation amount $\theta$ of the chroma signal A sinX extracted by said extracting means, said detecting means generating a clock signal based on the detected phase modulation amount $\theta$ and applying it to said conversion means;
outputting means for outputting coefficients $-(1-\cos\theta)$ and sin$\theta$ in accordance with the phase modulation amount $\theta$ ($\theta$ is any value to satisfy $-\pi/2 < \theta < \theta/2$) detected by said detecting means;
first multiplying means for multiplying the chroma signal A cosX output from said first delay means and the coefficient sin$\theta$ output from said outputting means;
second multiplying means for multiplying the chroma signal A sinX output from said second delaying means and the coefficient $-(1-\cos\theta)$ output from said outputting means;
first adder means for adding outputs of said first and second multiplying means; and
second adder means for adding an output of said first adder means and the composite video signal output from said conversion means.

6. The chroma phase modulator according to claim 5, in which said outputting means comprises a memory which stores the coefficients $-(1-\cos\theta)$ and sin$\theta$, these coefficients being read from said memory in accordance with the phase modulation amount $\theta$ of the chroma signal contained in the composite video signal.

7. The chroma phase modulator according to claim 5, in which said outputting means comprises a microcomputer for calculating the coefficients $-(1-\cos\theta)$ and sin$\theta$ in accordance with the phase modulation amount $\theta$ of the chroma signal contained in the composite video signal.

8. The chroma phase modulator according to claim 5, in which said extracting means comprises a bandpass filter.

9. The chroma phase modulator according to claim 5, further comprising playback means for playing the composite video signal back from a laser disk, the composite video signal being applied to said conversion means.

10. The chroma phase modulator according to claim 5, further comprising playback means for playing the composite video signal back from video tape, the composite video signal being applied to said conversion means.

11. The chroma phase modulator according to claim 5, in which said detecting means comprises:
sampling means for sampling a color burst signal output from said extracting means together with the chroma signal, with two sampling signals whose phases are 90° apart, said sampling means outputting levels of the color burst signal corresponding to the sampling signals;
memory means for storing phase modulation amounts $\theta$ corresponding to levels of the color burst signal in advance, the phase modulation amounts $\theta$ being accessed by the levels output from said sampling means;
a voltage controlled oscillator for generating the clock signal in accordance with a phase modulation amount $\theta$ read from said memory means;
frequency dividing means for dividing the frequency of the clock signal by two; and
generating means for generating the sampling signals from the clock signal frequency-divided by said frequency dividing means, said generating means supplying the sampling signals to said sampling means during the duration of the burst signal.

12. A time base corrector using a chroma phase modulator comprising:
playback means for playing a composite video signal back from a recording medium;
conversion means for converting the composite video signal from said playback means to a digital signal;
time base correcting means for correcting a time bas of the composite video signal from said conversion means;
extracting means for extracting a chroma signal-A sinX from the composite video signal output from said time base corrector;
first delay means for delaying the phase of the chroma signal-A sinX extracted by said extracting means by 90° to output a chroma signal A cosX;
second delay means for delaying the chroma signal-A sinX by a predetermined time to output a chroma signal A sinX;
detecting means for detecting a phase modulation amount $\theta$ of the chroma signal-A sinX extracted by said extracting means, said detecting means generating a clock signal based on the detected phase modulation amount $\theta$ and applying it to said conversion means;

outputting means for outputting coefficients $-(1-\cos\theta)$ and $\sin\theta$ in accordance with the phase modulation amount $\theta$ ($\theta$ is any value to satisfy $-\pi/2 < \theta < \theta/2$) detected by said detecting means;

first multiplying means for multiplying the chroma signal A cosX output from said first delay means and the coefficient $\sin\theta$ output from said outputting means;

second multiplying means for multiplying the chroma signal A sinX output from said second delaying means and the coefficient $-(1-\cos\theta)$ output from said outputting means;

first adder means for adding outputs of said first and second multiplying means; and second adder means for adding an output of said first adder means and the composite video signal output from said conversion means.

13. The corrector according to claim 12, in which said recording medium comprises a laser disk.

14. The corrector according to claim 12, in which said recording medium comprises video tape.

15. The corrector according to claim 12, in which said time base correcting means comprises:

memory means responsive to the clock signal from said detecting means for storing the composite video signal from said conversion means; and a reference oscillator for generating a stable signal used to read the composite video signal from said memory means.

16. A hue control device using chroma phase modulator comprising:

conversion means for converting a composite video signal (Y + A sinX) to a digital signal;

extracting means for extracting a chroma signal-A sinX from an output signal of said conversion means;

first delay means for delaying the phase of the chroma signal-A sinX extracted by said extracting means by 90° to output a chroma signal A cosX;

second delay means for delaying the chroma signal-A sinX extracted by said extracting means by a predetermined time to output a chroma signal A sinX;

detecting means for detecting a phase modulation amount $\theta$ of the chroma signal-A sinX extracted by said extracting means, said detecting means generating a clock signal based on the detected phase modulation amount $\theta$ and applying it to said conversion means;

outputting means for outputting coefficients $-(1-\cos\theta)$ and $\sin\theta$ in accordance with the phase modulation amount $\theta$ ($\theta$ is any value to satisfy $-\pi/2 < \theta < \theta/2$) detected by said detecting means;

first multiplying means for multiplying the chroma signal A cosX output from said first delay means and the coefficient $\sin\theta$ output from said outputting means;

second multiplying means for multiplying the chroma signal A sinX output from said second delaying means and the coefficient $-(1-\cos\theta)$ output from said outputting means;

first adder means for adding outputs of said first and second multiplying means;

second adder means for adding an output of said first adder means and the composite video signal output from said conversion means;

burst detecting means for detecting a burst signal contained in the composite video signal (Y + A sinX); and gate means for supplying a phase modulation amount $\theta$ to said coefficient outputting means, said gate means being disabled against the supply of the phase modulation amount to said coefficient outputting means when the burst signal is detected by said burst detecting means.

* * * * *